(12) United States Patent
Yamauchi

(10) Patent No.: US 7,719,956 B2
(45) Date of Patent: May 18, 2010

(54) TRUNK NETWORK SYSTEM FOR MULTIPOINT-TO-MULTIPOINT RELAY

(75) Inventor: Toshiro Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1148 days.

(21) Appl. No.: 11/317,197

(22) Filed: Dec. 22, 2005

(65) Prior Publication Data

US 2006/0133264 A1 Jun. 22, 2006

(30) Foreign Application Priority Data

Dec. 22, 2004 (JP) .............................. 2004-371388

(51) Int. Cl.
H04L 12/26 (2006.01)
(52) U.S. Cl. ...................................... 370/216; 370/242
(58) Field of Classification Search ................. 370/216, 370/241, 242, 246, 248, 250, 254; 710/50
See application file for complete search history.

(56) References Cited

U.S. PATENT DOCUMENTS

| | | | |
|---|---|---|---|
| 2002/0016874 A1* | 2/2002 | Watanuki et al. ............... | 710/51 |
| 2002/0194407 A1* | 12/2002 | Kim ............................ | 710/104 |
| 2004/0215905 A1* | 10/2004 | Armstrong et al. ........... | 711/156 |
| 2005/0120176 A1* | 6/2005 | Maeda et al. ................ | 711/114 |
| 2005/0243713 A1* | 11/2005 | Okuda ......................... | 370/216 |

FOREIGN PATENT DOCUMENTS

| | | |
|---|---|---|
| JP | 02-043848 | 2/1990 |
| JP | 6-132999 | 5/1994 |
| JP | 09-130421 | 5/1997 |
| JP | 10-304444 | 11/1998 |
| JP | 2002-26909 | 1/2002 |
| JP | A-2003-087276 | 3/2003 |
| WO | WO 99/57855 | 11/1999 |
| WO | WO 2004/028102 A1 | 4/2004 |
| WO | WO 2004/036800 A2 | 4/2004 |

OTHER PUBLICATIONS

Japanese Official Action dated Dec. 9, 2009 together with English language translation.
Japanese Official Action dated Feb. 24, 2010 together with English language translation.

* cited by examiner

Primary Examiner—Kwang B Yao
Assistant Examiner—Andrew Lai
(74) Attorney, Agent, or Firm—Scully, Scott, Murph & Presser, P.C.

(57) ABSTRACT

In a trunk network, each node, when notified from another node of a change in the state of a group to which external connection ports belong, changes the states of the external connection ports to cause external devices to detect the failure of the transmission route. A port state monitor unit classifies external connection ports into groups in advance and stores the correspondence of the external connection ports and the groups. The port state monitor unit then detects changes in the states of external connection ports. When a change of the state of any external connection port is detected in the port state monitor unit, a group state management unit reports state information that includes the states of groups that correspond to the external connection port to other nodes that make up the trunk network. Upon receiving state information from any other node, the group state management unit, in accordance with the states of groups that are included in the state information, changes the states of external connection ports that belong to these groups.

15 Claims, 13 Drawing Sheets

Fig. 2

| port | group | notification attribute | control attribute |
|---|---|---|---|
|  |  |  |  |
|  |  |  |  |
| ⋮ | ⋮ | ⋮ | ⋮ |

Fig. 5

| group | state |
|---|---|
|  |  |
|  |  |
|  |  |
| ⋮ | ⋮ |

Fig. 6

| relay node | group 1 | group 2 | --- |
|---|---|---|---|
|  |  |  |  |
|  |  |  |  |
|  |  |  |  |
| ⋮ | ⋮ | ⋮ |  |

Fig. 7A relay node 1

| port | group | notification attribute | control attribute |
|---|---|---|---|
| 21 | group 1 | OFF | ON |
| 22 | group 2 | ON | ON |

41

Fig. 7B relay node 2

| port | group | notification attribute | control attribute |
|---|---|---|---|
| 23 | group 1 | ON | OFF |
| 24 | group 2 | ON | ON |

42

Fig. 7C relay node 3

| port | group | notification attribute | control attribute |
|---|---|---|---|
| 25 | group 1 | ON | ON |
| 26 | group 2 | ON | ON |

43

Fig. 7D relay node 4

| port | group | notification attribute | control attribute |
|---|---|---|---|
| 27 | group 2 | ON | ON |

| relay node | group 1 | group 2 |
|---|---|---|
| 2 | up | up |
| 3 | up | up |
| 4 | -- | up |

45

Fig. 12A relay node 6

| port | group | notification attribute | control attribute |
|------|-------|------------------------|-------------------|
| 61   | 1     | OFF                    | ON                |

46

Fig. 12B relay node 7

| port | group | notification attribute | control attribute |
|------|-------|------------------------|-------------------|
| 62   | 1     | OFF                    | ON                |

47

Fig. 12C relay node 8

| port | group | notification attribute | control attribute |
|------|-------|------------------------|-------------------|
| 63   | 1     | OFF                    | ON                |
| 64   | 1     | ON                     | OFF               |

48

Fig. 12D relay node 9

| port | group | notification attribute | control attribute |
|------|-------|------------------------|-------------------|
| 65   | 1     | ON                     | OFF               |

49

TRUNK NETWORK SYSTEM FOR MULTIPOINT-TO-MULTIPOINT RELAY

BACKGROUND OF THE INVENTION

1. Field of the Invention

The present invention relates to a trunk network for realizing multipoint-to-multipoint relay, and more particularly to the notification of failures in a trunk network.

2. Description of the Related Art

Networks exist that are provided with alternate routes for improving reliability against failures. In the event of a failure on a transmission route in a network that is provided with alternate routes, the transmission of packets can be continued by switching to an alternate route. In such a case, however, communication is dropped during the time interval from the occurrence of the failure until the completion of switching.

As a result, shortening the time interval from the occurrence of the failure until switching is completed (hereinbelow referred to as the "route switching time interval") both obtains a corresponding shortening of the time interval in which communication is dropped and an improvement in the reliability of the network. The route switching time interval includes the time interval required from the occurrence of the failure until its detection (hereinbelow referred to as the "failure detection time interval"), and this failure detection time interval is a crucial factor in determining the reliability of the network.

Trunk networks exist that have a packet switching capability that provides multipoint-to-multipoint connection, these trunk networks providing connections between a plurality of external devices such as routers or MAC switches. Through the use of this type of trunk network, external devices are connected each other by way of a plurality of nodes.

If a failure should occur in this type of trunk network, the reachability of packets that pass through the trunk network can no longer be guaranteed. Examples of failures that would impede the reachability of packets include the failure of an external device, the failure of a port of a relay node that connects with an external device, or the failure of a relay node.

A device that is directly connected to the site of a failure can detect a device failure or a port failure as a link down (disconnection). By comparison, an external device that is not directly connected with the site of a failure cannot directly detect the failure.

A device that provides point-to-point connection, upon detecting that one link is down, can cause disconnection of the other link and thus enable notification of a failure to a device that cannot directly detect a link that is down (for example, refer to JP-A-2003-087276)

On the other hand, there are methods in which, as a method for verifying packet reachability in a trunk network that provides multipoint-to-multipoint connection, i.e., as a method for detecting failures, external devices exchange with each other control packets for survival verification. The external devices continuously send control packets at a prescribed period to partner devices, and further, monitor whether control packets are being continuously received from partner devices. The external devices then determine that reachability has been impeded when the control packets are no longer received and thus switch the transmission route of the packets.

However, the above-described background art has the following problems:

A method in which the disconnection of one link precipitates the disconnection of the other link in a device having the above-described type of point-to-point connection cannot be adapted to a trunk network that provides multipoint-to-multipoint connection. This inability comes as a result of the lack of a one-to-one correspondence between links in a trunk network that provides multipoint-to-multipoint connection. In other words, when the disconnection of a particular link is detected, determining which other link is to be disconnected is problematic because various connections are possible between links in a multipoint trunk network.

As a result, each external device preferably verifies by some method whether the reachability of packets by way, of the trunk network is secured or not, i.e., whether a failure has occurred or not. As an example, there is a method in which the above-described control packets for verifying survival are exchanged.

This method, however, generally entails a long time interval for detecting a failure. Shortening the period for transmitting control packets can shorten the failure detection time interval. However, shortening the period for transmitting control packets tends to increase the processing load in external devices or place pressure on the communication bandwidth of the transmission line. Consequently, there is typically a limit to shortening the transmission period of the control packets, and adequately shortening the route switching time is therefore problematic. A method realized by means of survival verification control packets typically requires a failure detection time interval ranging from ten seconds to several minutes.

As a result, during the long time interval from the occurrence of a failure until completion of switching, the external device continues to transmit packets to the route in which reachability has been impeded, lengthening the time interval in which communication is dropped.

SUMMARY OF THE INVENTION

It is an object of the present invention to provide a trunk network in which an external device can detect a failure in the transmission route in a short time interval.

To achieve the above-described object, the node device of the present invention is a node device that makes up a trunk network for connecting together external devices and includes external connection ports, a port state monitor units, and a group state management units.

The external connection ports are ports for connecting to external devices. The port state monitor unit classifies external connection ports in groups in advance, stores the correspondence of the external connection ports and the groups, and detects changes in the states of the external connection ports.

When a change is detected in the state of any external connection port in the port state monitor unit, the group state management unit reports state information that includes the states of the groups that correspond to that external connection port to other nodes that make up the trunk network, and upon reception of state information from any of the other nodes, changes the states of the external connection ports that belong to that group in accordance with the state information of the group that is included in that state information.

According to the present invention, the external connection ports of node devices are classified into groups in advance, and the external connection ports are monitored in the port state monitor unit of each node device. In this way, changes in the state of each group are detected, the change in the state of a group is reported to other nodes from the group state management unit of a node device that has detected a change in the state of a group, and the states of ports that belong to that group are changed in the group state management units of other node devices. As a result, an external device that is connected to a trunk network that is made up from node devices can learn the occurrence of a failure in a short time interval by means of the changes in states of ports. In addition, because state changes are reported in group units, when a change in state occurs in any port, state changes can be generated in only ports that relate to that port and notification then implemented to external devices.

The above and other objects, features, and advantages of the present invention will become apparent from the following description with references to the accompanying drawings, which illustrate examples of the present invention.

BRIEF DESCRIPTION OF THE DRAWINGS

FIG. 2 is a table showing the attributes that are set in each external connection port of relay nodes according to the first embodiment;

FIG. 5 is a table showing group states of a particular node;

FIG. 6 is a table showing group states of other nodes;

FIG. 7 shows tables showing the attributes of ports of each relay node in an example of the operation of the first embodiment;

FIG. 9 is a table showing an example of group states of other nodes that are controlled in relay node 1 (before the occurrence of the failure of relay node 3);

FIG. 12 shows tables showing the attributes of ports of each relay node in an ideal example of the second embodiment;

DETAILED DESCRIPTION OF THE PREFERRED EMBODIMENTS

Figure 1:
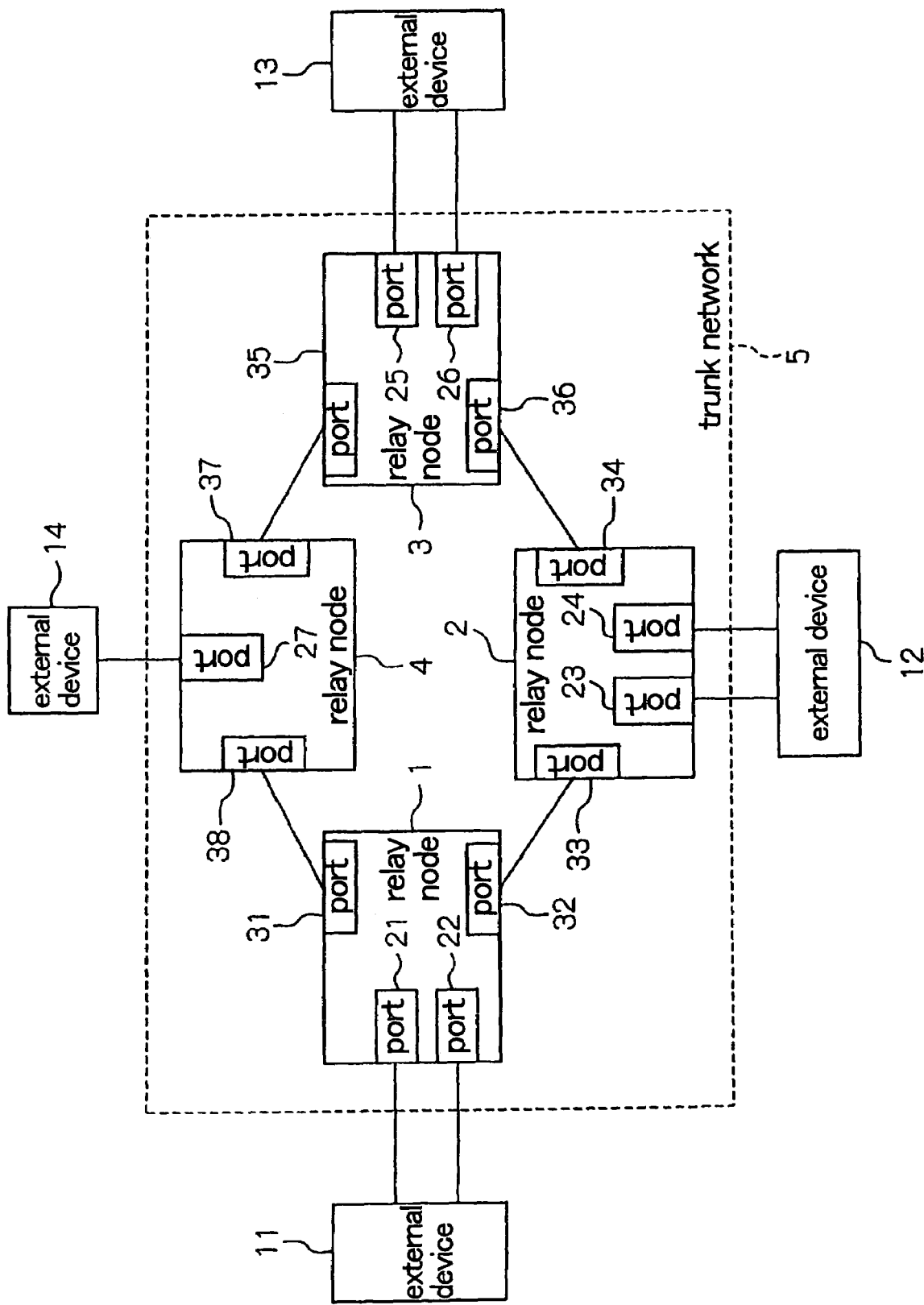
FIG. 1 is a block diagram showing a trunk network according to the first embodiment.

The following explanation regards the first embodiment of the present invention. Referring to FIG. 1, trunk network 5 of the first embodiment includes relay nodes 1-4.

Relay node 1 includes external connection ports 21, 22 and node connection ports 31 and 32. Ports 21 and 22 are connected to external device 11. Relay node 2 includes external connection ports 23 and 24 and node connection ports 33 and 34. Ports 23 and 24 are connected to external device 12. Relay node 3 includes external connection port 25 and 26 and node connection ports 35 and 36. Ports 25 and 26 are connected to external device 13. Relay node 4 includes external connection port 27 and node connection ports 37 and 38. Port 27 is connected to external device 14.

In addition, port 32 of relay node 1 and port 33 of relay node 2 are connected, port 34 of relay node 2 and port 36 of relay node 3 are connected, port 35 of relay node 2 and port 36 of relay node 3 are connected, port 35 of relay node 3 and port 37 of relay node 4 are connected, and port 38 of relay node 4 and port 31 of relay node 1 are connected.

External devices 11, 12, 13 and 14 are, for example, packet switch devices such as routers or MAC switches. Trunk network 5 transfers packets from an external device to the external device of the address written in the header. In other words, external devices 11, 12, 13, and 14 are multipoint-to-multipoint connected by way of trunk network 5.

Various attributes are set in advance in each external connection port of relay nodes 1-4.

FIG. 2 is a table showing the attributes that are set in the external connection ports of a relay node according to the first embodiment. Referring to FIG. 2, the group, notification attribute, and control attribute are set in each port.

The external connection ports of each relay node are classified into groups by means of the settings. The method of determining these groups is open to variation, but according to one method that can be considered, settings may be made such that groups are composed of ports that will be affected by the occurrence of a failure in any port within the group. According to another method that can be considered, ports that are included in the same set of a redundant composition may be classified in the same group.

The notification attribute is attribute information that indicates whether, when a failure occurs at that port, the failure of the group is to be notified to other relay nodes, this attribute being set to "ON" or "OFF." The "ON" setting of failure notification indicates that a failure is to be reported, and the "OFF" setting indicates that a failure is not to be reported.

The control attribute is attribute information that indicates whether a port, when belonging to a group that has been notified of a failure from another relay node, is to be forcibly disconnected or not; this attribute being set to "ON" or "OFF." The "ON" setting of the control attribute indicates forced disconnection, and the "OFF" setting indicates that forced disconnection is not to be carried out.

Figure 3:
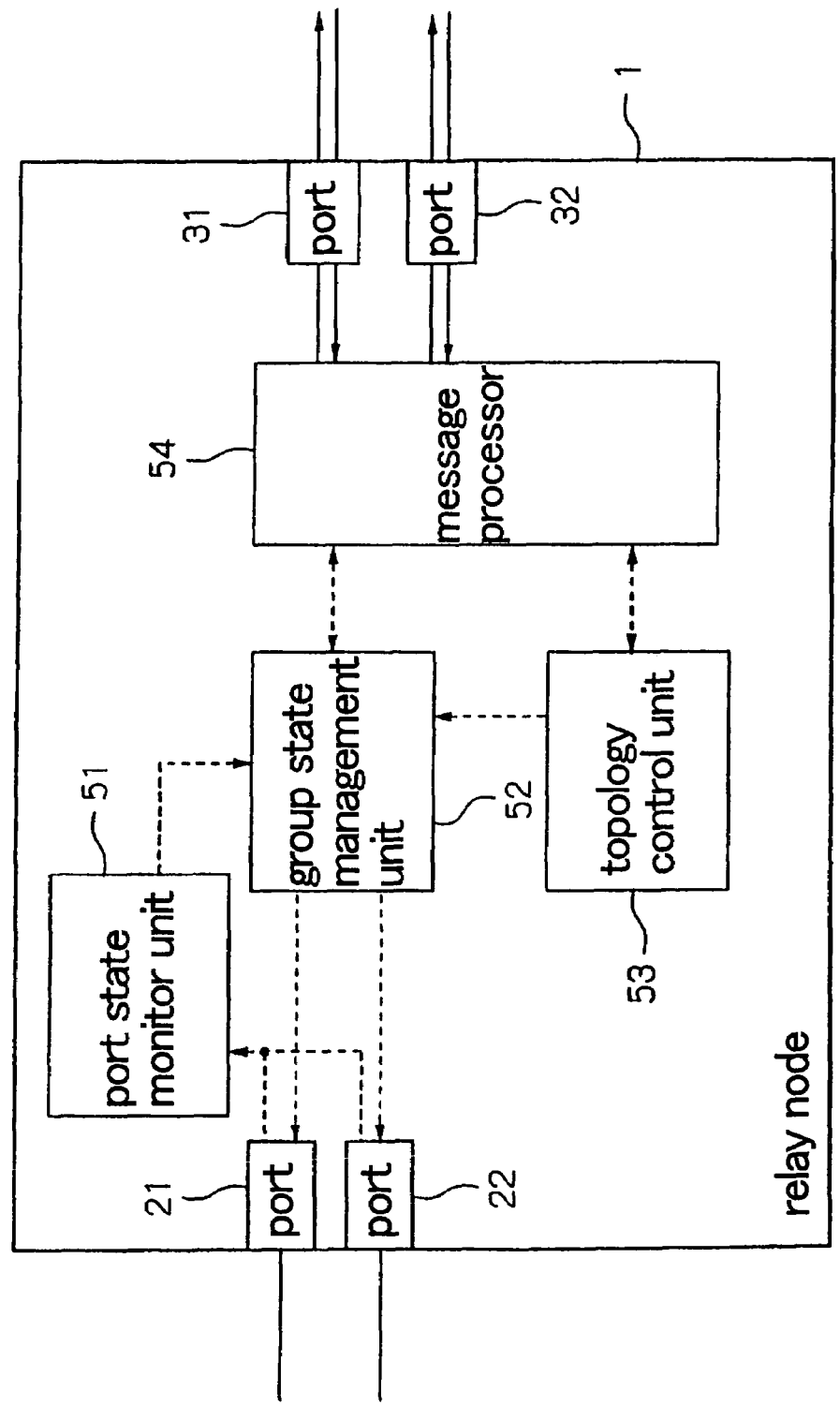
FIG. 3 is a block diagram showing a relay node according to the first embodiment.

FIG. 3 is a block diagram showing the configuration of a relay node according to the first embodiment. Relay node 1 is shown as an example in this figure, but the other relay nodes 2-4 are of the same configuration.

Referring to FIG. 3, relay node 1 includes: port state monitor unit 51, group state management unit 52, topology control unit 53, message processor 54, and ports 21, 22, 31, and 32.

Port state monitor unit 51 holds in advance the attribute information of each port shown in FIG. 2 in a form that allows reference. Port state monitor unit 51 monitors changes in the states in external connection ports 21 and 22, and upon detecting a change in the state of a port, reports the change in port state to group state management unit 52 if the notification attribute that is set in the port is "ON."

Figure 4:
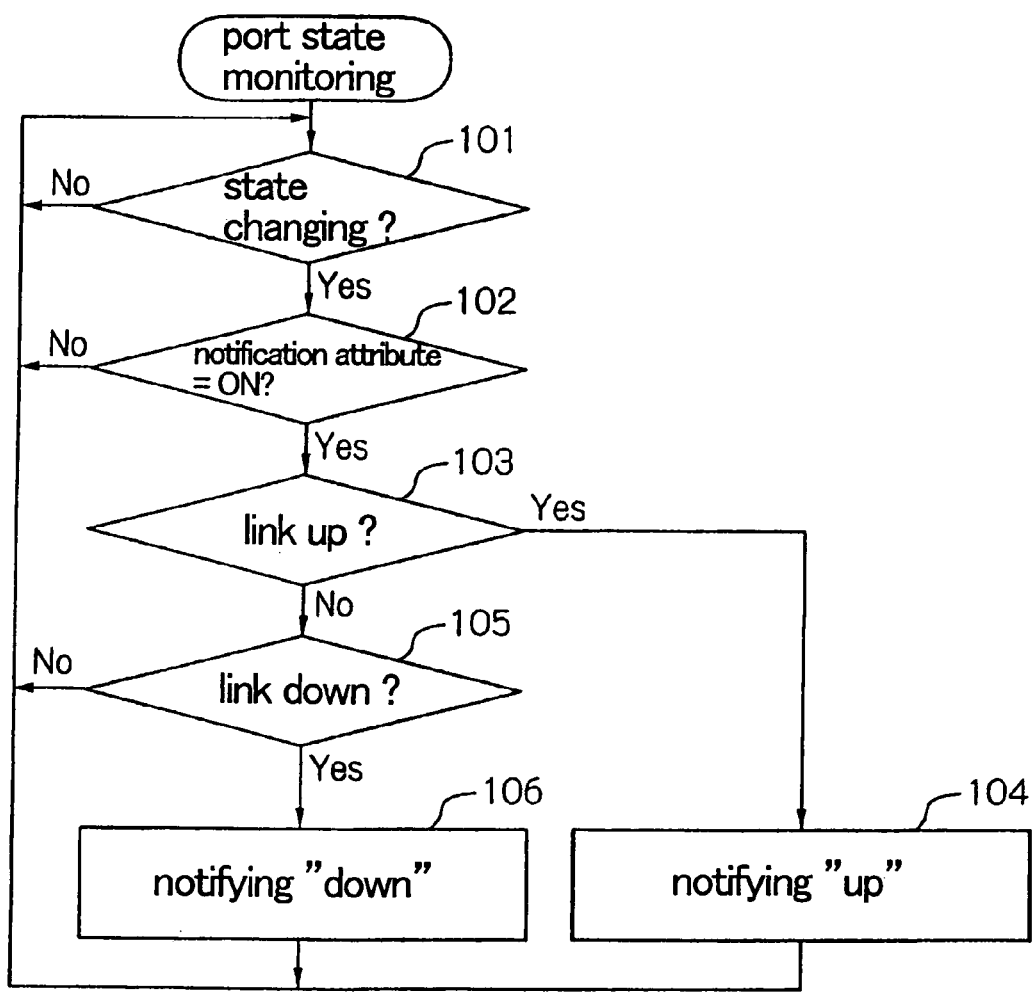
FIG. 4 is a flow chart showing the operations of the port state monitor unit.

FIG. 4 is a flow chart showing the operations of the port state monitor unit. Referring to FIG. 4, port state monitor unit 51 first monitors whether there are changes in port state (Step 101). When there is a change in port state, port state monitor unit 51 next determines whether the notification attribute of that port is "ON" (Step 102). If the notification attribute is "OFF," port state monitor unit 51 returns to Step 101 to monitor changes in port states.

If the notification attribute of the port is "ON," port state monitor unit 51 next determines whether the change in port state is to "up" link (connection) (Step 103). If the change is to "up" link, port state monitor unit 51 notifies group state management unit 52 that the group to which the port belongs is in the "up" state (Step 104) and returns to Step 101.

If it is determined in Step 103 that the change in state is not "link up", port state monitor unit 51 next determines whether the change in the state of the port is "link down" (disconnection) (Step 105). If the change is "link down", port state monitor unit 51 notifies group state management unit 52 that the group to which that port belongs is in the "down" state (Step 106) and then returns to Step 101.

If it is determined in Step 105 that the change in state is not "link down", port state monitor unit 51 returns to Step 101.

Returning to the explanation of FIG. 3, group state management unit 52 manages the states of the groups to which each of the external connection ports of its own node belong (hereinbelow referred to as "group states of its own node") based on the notification from port state monitor unit 51. It will be assumed that each group is in either an "up" state or a "down" state. The "up" state is a state in which normal operation is possible, and the "down" state is a state in which operation is halted due to some cause (such as a failure).

Figures 5, 6:
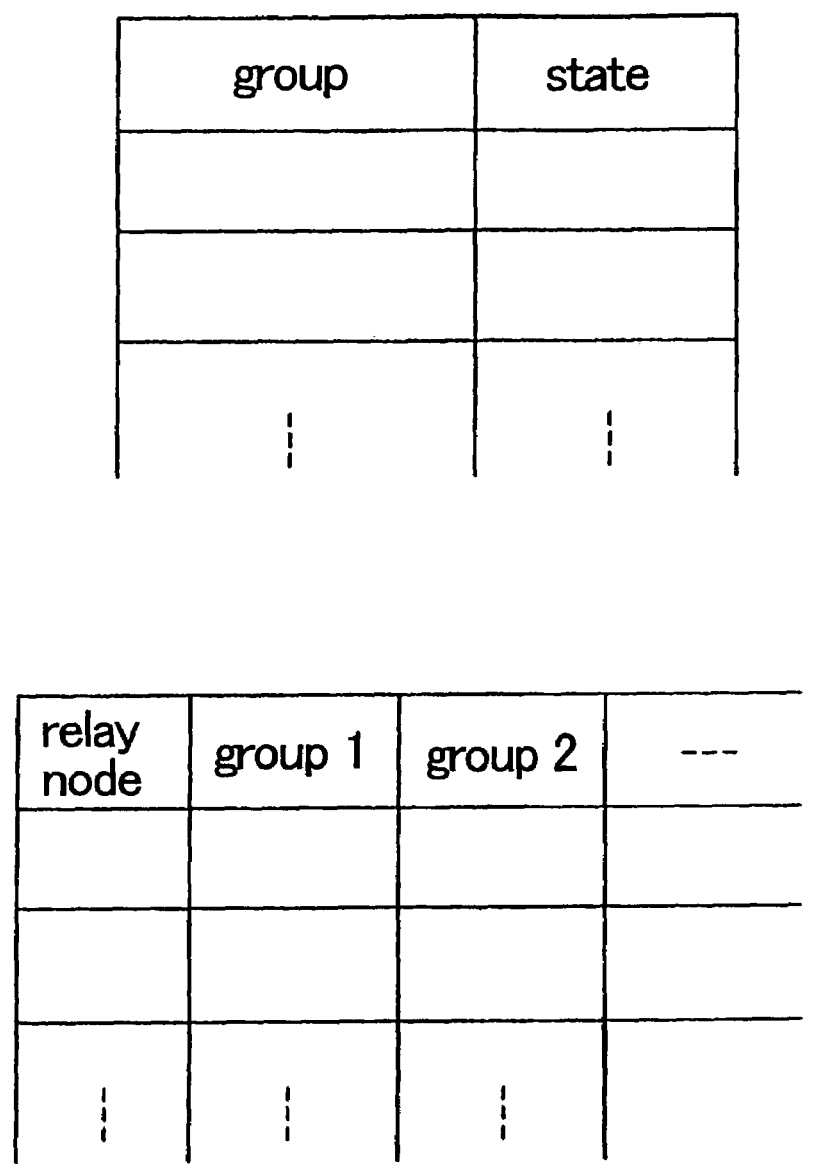

FIG. 5 is a table showing the group states of a subject node. The states of each of the groups to which the ports of the subject node belong are controlled in the table of FIG. 5.

When a change occurs in the group states of its own node, group state management unit 52 sends state information of each group to message processor 54 and instructs the preparation and transmission of a message.

In addition, group state management unit 52, based on notification from other nodes by way of message processor 54, manages the states of groups to which belong each of the external connection ports in which the notification attribute is "ON" in each of the other nodes (hereinbelow referred to as "group states of other nodes"). This management is carried out for controlling ports of its own node in accordance with the changes in the states of other nodes, and management is not necessary for external connection ports in which the notification attribute is "OFF" in other nodes, i.e., ports for which notification does not occur even in the event of a failure.

FIG. 6 is a table that shows the group states of other nodes. FIG. 6 is a means for managing the states of each of groups to which belong ports of other nodes having the notification attribute "ON."

Group state management unit 52 examines the group states of its own node and the group states of all other nodes, and finds groups that are in the "down" state in any node (hereinbelow referred to as "'down' state groups") and groups that are in the "up" state (hereinbelow referred to as "'up' state groups") of all nodes.

When there is a group that changes from an "up" state group to a "down" state group, group state management unit 52 forcibly disconnects any ports in its own node that belong to that group, and moreover, for which the control attribute is "ON." Forced disconnection means forcibly placing the link in the "down" state and causing the external device that is the connection destination to recognize the disconnection. Methods for forced disconnection include, for example, transmission of invalid code, halting optical signals, halting electrical signals, and turning OFF the power supply. After recognizing that the link is down, the external device is able to halt the transmission of packets to that link. This approach can prevent the flow to trunk network 5 of packets that will not arrive and thus enables a more effective utilization of bandwidth. Alternatively, if a transmission route is duplicated, the external device can take the forced disconnection as a prompt for route switching. This approach achieves a greater shortening of the failure detection time interval than the use of control packets for survival verification and also shortens the route switching time interval, thus resulting in an improvement in network reliability.

On the other hand, if there is a group that changes from a "down" state group to an "up" state group, group state management unit 52 releases the forced disconnection of ports of its own node that belong to that group, and moreover, that have the control attribute "ON." External devices that are connected to these ports may take this release of the forced disconnection as a prompt to resume the transmission of packets to this link, or as a prompt to switch back the route.

In addition, when group state management unit 52 is notified from topology control unit 53 that reachability to any other node is impeded, group state management unit 52 places all of the groups of the other nodes in the "down" state in the group states of other nodes shown in FIG. 6. If, as a result of placing these groups in the "down" state, there are groups that have changed from an "up" state group to a "down" state group, group state management unit 52, as previously described, forcibly disconnects the ports that belong to these groups, and moreover, that have control attributes set to "ON."

Topology control unit 53 examines the reachability from its own node to other nodes. The examination method used here is open to variation, but a method that can verify reachability in a shorter time interval than when using control packets for survival verification is preferable. As an example, RPR (Resilient Packet Ring) prescribed in IEEE 802.17 can be used. RPR enables failure detection in several tens of msec. When the reachability from a particular node to another node is impeded, topology control unit 53 reports this state to group state management unit 52.

Message processor 54 prepares and transmits messages to other nodes, and further, receives and analyzes messages from other nodes.

Explanation next regards an actual example of the operation of a trunk network according to the first embodiment.

FIG. 7 shows tables showing the attributes of ports of each relay node in the example of the operation of the first embodiment. FIG. 7A is attribute table 41 of relay node 1, FIG. 7B is attribute table 42 of relay node 2, FIG. 7C is attribute table 43 of relay node 3, and FIG. 7D is attribute table 44 of relay node 4.

As an example of the operation of trunk network 5, a first set composed of port 21 of relay node 1, port 23 of relay node 2, and port 25 of relay node 3 is distinguished from a second set composed of port 22 of relay node 1, port 24 of relay node 2, and port 26 of relay node 3, a redundant system being constituted by this pair of sets. Although redundancy is not held between external device 14 and relay node 4, port 27 of relay node 4 is assumed to be included in the second set.

On the premise of this network operation, groups are determined in advance such that port 21 of relay node 1, port 23 of relay node 2, and port 25 of relay node 3 belong to group 1, and port 22 of relay node 1, port 24 of relay node 2, port 26 of relay node 3, and port 27 of relay node 4 belong to group 2.

The notification attribute and control attribute are both set to "ON" for port 22, port 24, port 25, port 26, and port 27. The notification attribute is set to "OFF" and the control attribute is set to "ON" for port 21, and the notification attribute is set to "ON" and the control attribute set to "OFF" for port 23.

Figure 8:
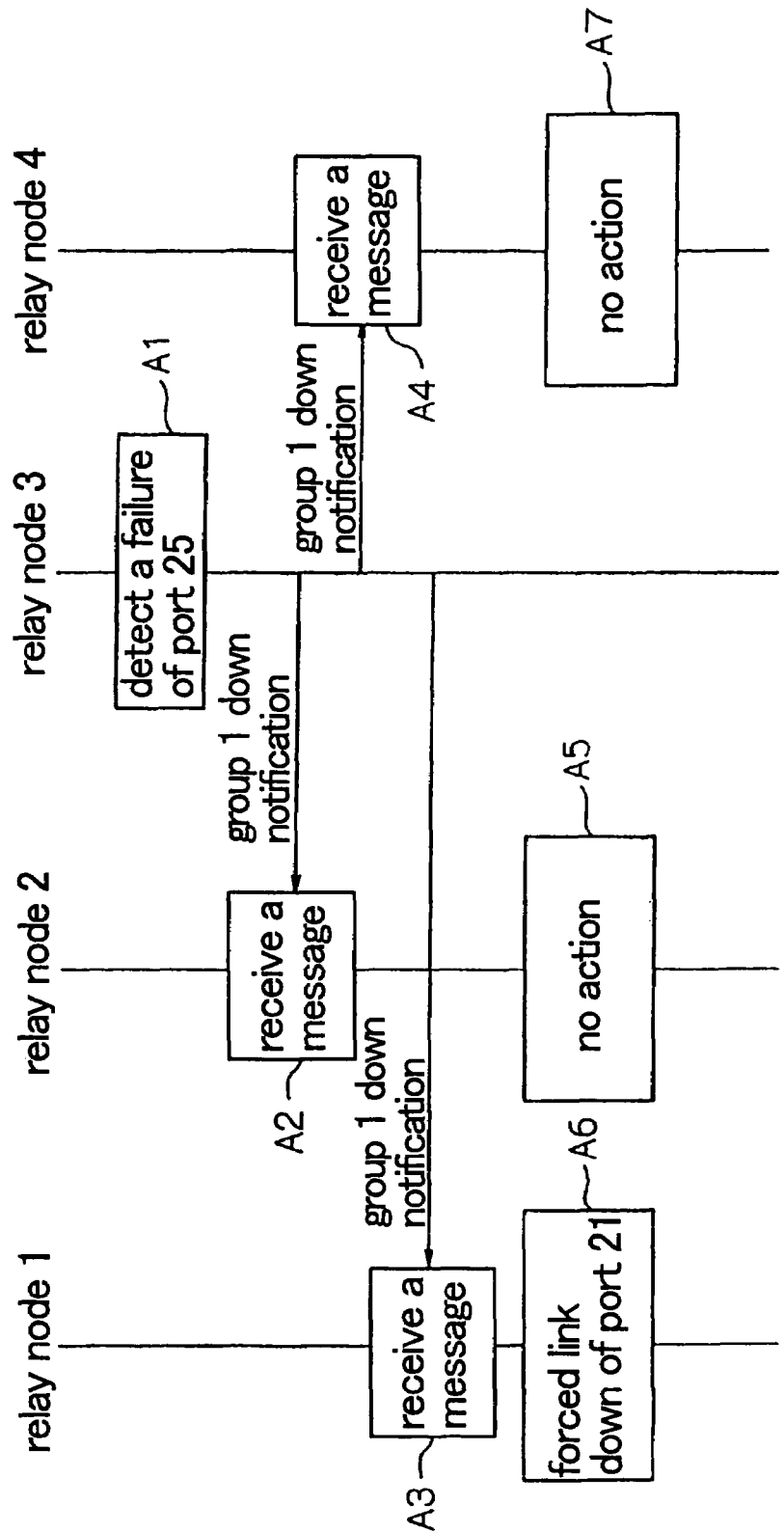
FIG. 8 is a sequence chart showing an example of the operation when a failure of port 25 is detected in relay node 3.

In this example, operation is shown for a case in which a failure of port 25 is detected in relay node 3. FIG. 8 is a sequence chart showing an example of the operation for a case in which the failure of port 25 is detected in relay node 3.

Referring to FIG. 8, relay node 3 first detects a failure of port 25 in port state monitor unit 51, (Step A1).

Port state monitor unit 51 that has detected the failure of port 25 refers to attribute table 43 of FIG. 7C and checks the notification attribute of the group to which port 25 belongs. In this case, port 25 belongs to group 1, and the notification attribute of group 1 is "ON." As a result, port state monitor unit 51 notifies group state management unit 52 of the change in state indicating that group 1 is in a "link down" state. Based on the notification from port state monitor unit 51, group state management unit 52 instructs message processor 54 to prepare and transmit a message indicating the "link down" of group 1. Under the instruction from group state management unit 52, message processor 54 prepares and transmits a message, whereupon the message is sent from relay node 3 to the other relay nodes 1, 2, and 4.

Relay node 2 receives and analyzes the message from relay node 3 in message processor 54 (Step A2). Relay node 2 then refers to attribute table 42 of FIG. 7B in group state management unit 52 to check the control attributes of the ports that belong to group 1. In this case, the control attribute of port 23 is "OFF," and relay node 2 therefore takes no action with regard to port 23 that belongs to group 1 (Step A5).

Relay node 1 receives and analyzes messages from relay node 3 in message processor 54 (Step A3). Relay node 1 then refers to attribute table 41 of FIG. 7A in group state management unit 52 to check the control attribute of ports that belong to group 1. In this case, the control attribute of port 21 is "ON," and relay node 1 therefore forcibly disconnects port 21 that belongs to group 1 by means of group state management unit 52 (Step A6).

Relay node 4 receives and analyzes messages from relay node 3 in message processor 54 (Step A4). Relay node 4 then refers to attribute table 44 of FIG. 7D by means of group state management unit 52, but takes no action because no ports in relay node 4 belong to group 1 (Step A7).

As can be understood from this example of the operation, according to the present embodiment, when a failure occurs in an external connection port in any relay node in trunk network 5, the disconnection of the group to which the port belongs is reported to other relay nodes, and in other nodes, ports that belong to this group, and moreover, that have the control attribute set to "ON" are forcibly disconnected.

Although not shown in the figure, upon recovery from the failure of port 25 of relay node 3, relay node 3 determines that the failure of group 1 has recovered and transmits a message indicating the recovery from the failure of group 1 to other relay nodes 1, 2, and 4. Relay nodes 1, 2, and 4, having received this notification, release the forced disconnection of the ports that belong to group 1, and moreover, that have the control attribute set to "ON."

Explanation next regards a second example of the operation of a trunk network according to the first embodiment.

The attributes of the ports of each relay port are assumed to be identical to those shown in FIG. 7. In this case, the operation is shown for a case in which relay node 1 detects a failure of port 21. The operation of this example is simple and is therefore not shown in a figure.

Relay node 1 first detects the failure of port 21 in port state monitor unit 51. Port state monitor unit 51, having detected the failure of port 21, refers to attribute table 41 of FIG. 7A, and checks the notification attribute of group 1 to which port 21 belongs. In this case, port 21 belongs to group 1, and the notification attribute of group 1 being "OFF," port state monitor unit 51 does not notify group state management unit 52 of the change in the state of the port. As a result, messages are not transmitted to other relay nodes, and forced disconnection is not carried out in other relay nodes.

Explanation next regards a third example of the operation of the trunk network according to the first embodiment.

The attributes of the ports of each relay port are assumed to be identical to those shown in FIG. 7.

FIG. 9 is a table showing an example of the group states of other nodes that are managed in relay node 1 (before the occurrence of a failure of relay node 3). Referring to table 45 shown in FIG. 9, in the state preceding the occurrence of a failure in relay node 3, relay node 1 recognizes that groups 1 and 2 of relay node 2, groups 1 and 2 of relay node 3, and group 2 of node 4 are all in the "up" state. In other words, relay node 1 recognizes that groups 1 and 2 are "up" state groups.

Figure 10:
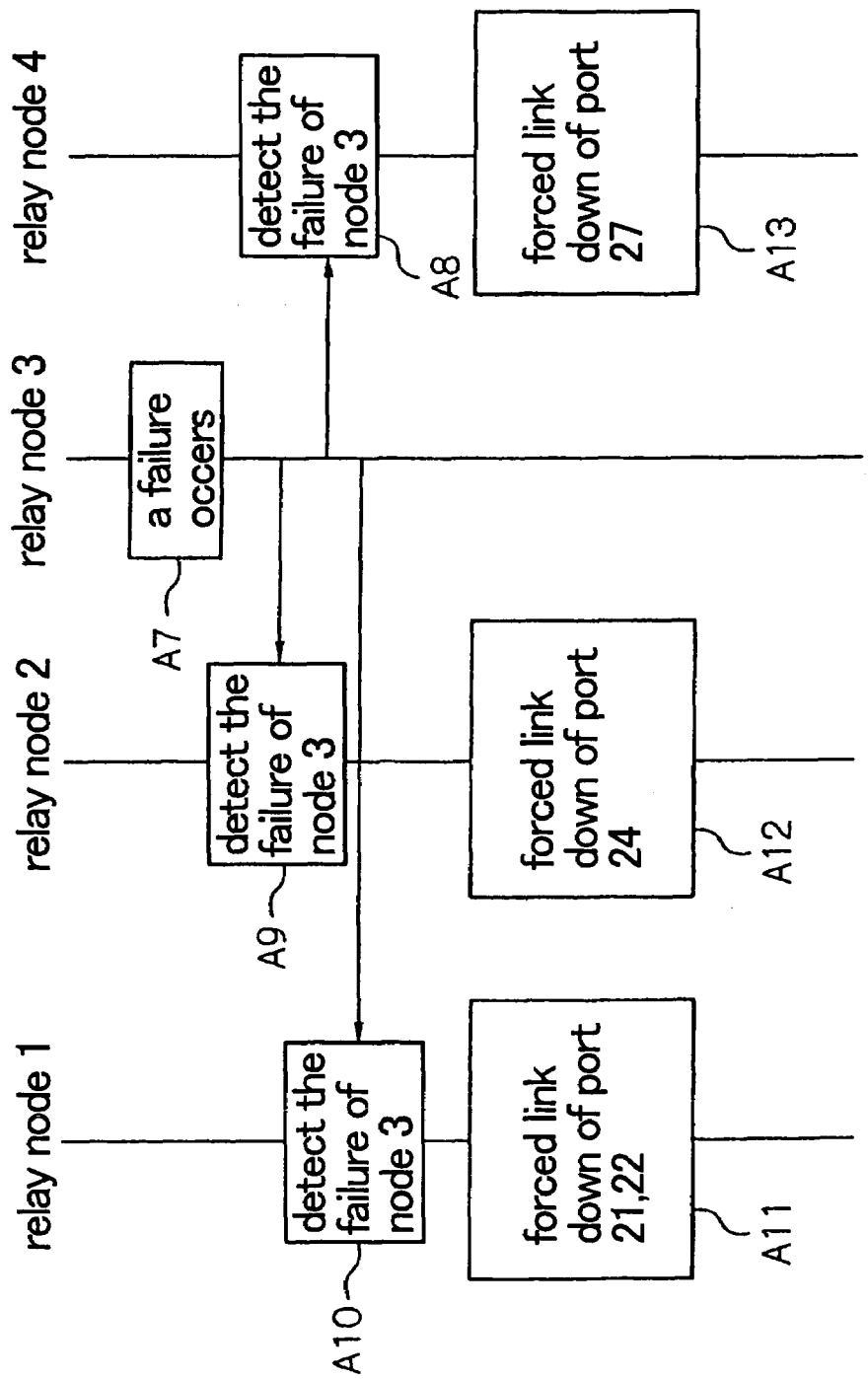
FIG. 10 is a sequence chart showing an example of the operation when a failure occurs in relay node 3 and other relay nodes 1, 2, and 4 detect the obstruction to reachability with relay node 3.

Operations are here shown for a case in which a failure occurs in relay node 3, and the other nodes 1, 2, and 4 detect that the reachability with relay node 3 is impeded. FIG. 10 is a sequence chart showing an example of operation for a case in which a failure occurs in relay node 3 and the other nodes 1, 2, and 4 detect that the reachability with relay node 3 is impeded.

Referring to FIG. 10, a failure first occurs in relay node 3 (Step A7).

Relay node 1 detects in topology control unit 53 that the reachability to relay node 3 has been impeded (Step A10). Topology control unit 53, having detected that the reachability to relay node 3 is impeded, reports this state to group state management unit 52. Group state management unit 52, having received the notification from topology control unit 52, updates the table that is shown in FIG. 9 and places groups 1 and 2 to which each of the ports of relay node 3 belong in the "down" state. As a result of placing groups 1 and 2 in the "down" state, groups 1 and 2 change from "up" state groups to "down" state groups. Group state management unit 52 therefore forcibly disconnects ports 21 and 22 that belong to these groups 1 and 2, and moreover, that have the control attribute set to "ON" (Step A11).

Relay node 4 detects in topology control unit 53 that the reachability to relay node 3 is impeded (Step A8). Topology control unit 53, having detected that reachability to relay node 3 has been impeded, reports this state to group state management unit 52. Group state management unit 52, having received the notification from topology control unit 52, places groups 1 and 2 to which each port of relay node 3 belongs, in the "down" state. As a result of placing groups 1 and 2 in the "down" state, groups 1 and 2 change from "up" state groups to "down" state groups. Relay node 4 lacks any ports that belong to group 1, and group state management unit 52 therefore forcibly disconnects port 27 that belongs to group 2, and moreover, that has the control attribute set to "ON" (Step A13).

Relay node 2 detects in topology control unit 53 that reachability to relay node 3 is impeded (Step A9). Topology 53 that has detected that reachability to relay node 3 is impeded reports this state to group state management unit 52. Group state management unit 52, having received the notification from topology control unit 52, places groups 1 and 2 to which each port of relay node 3 belongs in the "down" state. As a result of placing groups 1 and 2 in the "down" state, groups 1 and 2 change from "up" state groups to "down" state groups. Group state management unit 52 therefore forcibly disconnects port 24 that belongs to this group 2, and moreover, that has the control attribute set to "ON" (Step A12).

As can be understood from this example of operation, when a failure occurs in any relay node in trunk network 5 in the present embodiment, it is detected in other relay nodes that reachability to the relay node in which the failure occurred is impeded, and ports that have the control attribute set to "ON," and moreover, that belong to the group to which belongs the port of the relay node in which the failure occurred and for which the notification attribute is set to "ON" are forcibly disconnected.

Although not shown in a figure, upon recovery from the failure of relay node 3, the reachability to relay node 3 also recovers in relay nodes 1, 2, and 4, and relay nodes 1, 2, and 4 therefore detect the recovery from the failure of relay node 3 and release the forced disconnection of the ports that belong to groups 1 and 2, and moreover, that have the control attribute set to "ON."

As described in the foregoing explanation, according to the present embodiment, external connection ports 21-27 of each of relay nodes 1-4 that make up trunk network 5 are classified into groups in advance, changes in the state of each group are detected by monitoring external connection ports 21-27 in port state monitor unit 51 of each of relay nodes 1-4, the change in the state of a group is reported to the other relay nodes by way of message processor 54 from group state management unit 52 of the relay node that detected the change in state of a group, and ports that belong to this group are forcibly disconnected in group state management units 52 of other relay nodes, whereby the occurrence of a failure can be sensed in a short time interval by means of the disconnection of external devices 11-14.

In addition, according to the present embodiment, the occurrence of a failure is reported to external devices by means of the disconnection of ports, and the use of a special protocol between relay nodes and external devices is therefore not required.

Further, according to the present embodiment, external connection ports in a trunk network are classified into groups and notification is carried out in group units, whereby, when a failure occurs in any port, it is possible to forcibly disconnect only ports that are associated with that port and to report the failure to external devices 11.

According to the present embodiment, reporting or not reporting a failure (ON/OFF of the notification attribute) and implementing or not implementing forced disconnection control (ON/OFF of the control attribute) can be set as parameters for external connection ports, and the present embodiment therefore enables flexible operation of whether to report a failure to other relay nodes or whether to forcibly disconnect. For example, the notification attribute may be set to "ON" for ports having a high degree of importance. Further, the control attribute may be set to "OFF" for ports having a low degree of importance and for which alternate routes are not established. Still further, the notification attribute of a particular port may be set to "OFF" to cause continuation of communication by means of other ports within the same group.

According to the present embodiment, group state management unit 52 forcibly places in the "link down" state the external connection port that belongs to group that is in a "down" state for any of the other nodes and places in the "link up" state the external connection ports that belong to groups that are in the "up" state for all other nodes; whereby group state management unit 52 can notify other external devices of the occurrence of a failure if a failure occurs in even one port having the notification attribute set to "ON" within a group.

Explanation next regards the second embodiment of the present invention.

In the second embodiment, a configuration is shown as an ideal example in which a server and client devices (hereinbelow referred to as "clients") are connected as external devices to relay nodes.

Figure 11:
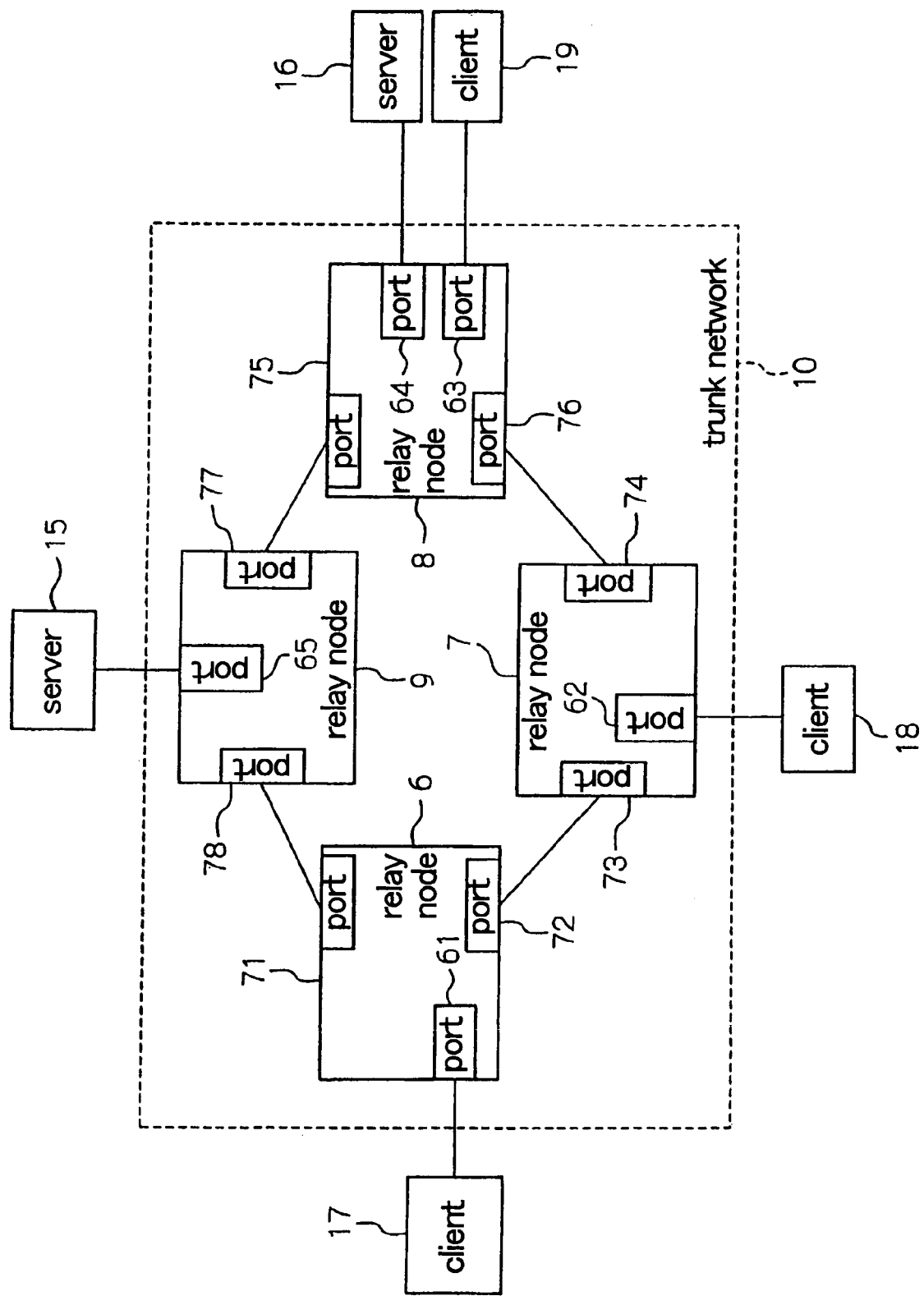
FIG. 11 is a block diagram showing a trunk network according to the second embodiment.

FIG. 11 is a block diagram showing the configuration of the trunk network according to the second embodiment. Referring to FIG. 11, trunk network 10 includes relay nodes 6-9.

Relay node 6 includes external connection port 61 and node connection ports 71 and 72. Port 61 is connected to client 17. Relay node 7 includes external connection port 62 and node connection ports 73 and 74. Port 62 is connected to client 18. Relay node 8 includes external connection ports 63 and 64 and node connection ports 75 and 76. Port 64 is connected to server 16 and port 63 is connected to client 19. Relay node 9 includes external connection port 65 and node connection ports 77 and 78. Port 65 is connected to server 15.

Port 72 of relay node 6 and port 73 of relay node 7 are connected, port 74 of relay node 7 and port 76 of relay node 8 are connected, port 75 of relay node 8 and port 77 of relay node 9 are connected, and port 78 of relay node 9 and port 71 of relay node 6 are connected.

In the second embodiment, servers 15 and 16 and clients 17-19 are connected as external devices to trunk network 10. As in the first embodiment, trunk network 10 transfers packets from external devices to the external devices of the addresses that are written in headers. In other words, servers 15 and 16 and clients 17-19 are multipoint-to-multipoint connected by way of trunk network 10. The plurality of clients 17-19 share the use of servers 15 and 16. Server 15 and server 16 may constitute a redundant pair.

Various attributes are set in advance in each of the external connection ports of relay nodes 6-9. The attributes that are set in each of the external connection ports of relay node 6-9 are the same as those of the first embodiment shown in FIG. 2. In the present embodiment, however, as an ideal example, the settings of the various attributes differ depending on whether the port is connected to a client or to a server.

FIG. 12 shows tables showing the attributes of the ports of each relay node in an ideal example of the second embodiment. FIG. 12A is attribute table 46 of relay node 6, FIG. 12B is attribute table 47 of relay node 7, FIG. 12C is attribute table 48 of relay node 8, and FIG. 12D is attribute table 49 of relay node 9.

All external connection ports 61-65 belong to the same group 1. Ports 65 and 64 that are connected to servers 15 and 16 have the notification attribute set to "ON" and the control attribute set to "OFF." Ports 61-63 that are connected to clients 17-19 are set with the notification attribute "OFF" and the control attribute "ON."

Figure 13:
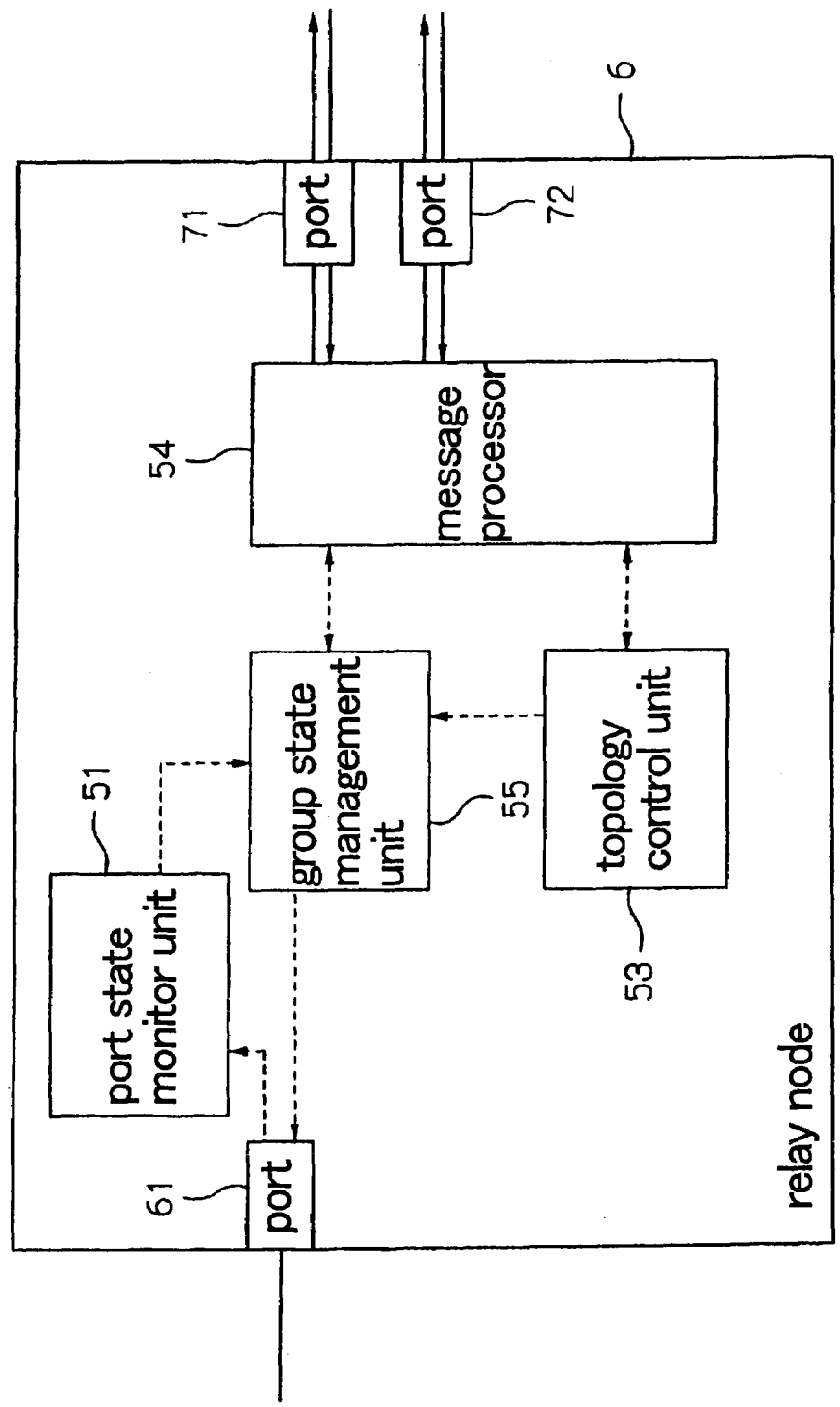
FIG. 13 is a block diagram showing a relay node according to the second embodiment.

FIG. 13 is a block diagram showing the configuration of a relay node according to the second embodiment. In this case, relay node 6 is shown as an example, but the other relay nodes 7-9 are of the same configuration.

Referring to FIG. 13, relay node 6 includes: port state monitor unit 51, group state management unit 55, topology control unit 53, message processor 54, and ports 61, 71, and 72.

Port state monitor unit 51, topology control unit 53, and message processor 54 are identical to the components in the first embodiment. In addition, ports 61, 71, and 72 are identical to the ports in the first embodiment.

Regarding the management of the group states of its own node, the operation of group state management unit 55 is identical to that of group state management unit 52 of the first embodiment. As with group state management unit 52 of the first embodiment, when a change occurs in the group states of its own node, group state management unit 55 sends state information of each group to message processor 54 and instructs the preparation and transmission of a message.

However, regarding the handling of the group states of other nodes, the operation of group state management unit 55 differs from that of group state management unit 52 of the first embodiment.

Group state management unit 55 manages the group states of other nodes based on notification from other nodes by way of message processor 54, as shown in FIG. 6. Group state management unit 55 performs management for the purpose of controlling ports of its own node in accordance with changes in the state of other nodes, and has no need to manage external connection ports having the notification attribute "OFF" in other nodes, i.e., ports for which notification is not implemented despite failures. To this point, the group state management unit is identical to that of the first embodiment.

In this case, group state management unit 55 examines the group states of its own node and the group states of all other nodes and finds groups that are in the "down" state in all nodes as "down state groups" and groups that are in the "up" state in at least one node as "up state groups." In this point, the operation differs from that of the first embodiment.

As in the first embodiment, when there are groups that have changed from an "up" state group to a "down" state group, group state management unit 55 forcibly disconnects any ports of its own node that belong to these groups, and moreover, that have the control attribute "ON." If there are groups that have changed from a "down" state group to an "up" state group, group state management unit 55 releases the forced disconnection of any ports in its own node that belong to these groups, and moreover, that have the control attribute "ON."

Further, as in the first embodiment, when notified from topology control unit 53 that the reachability to any other node is obstructed, group state management unit 55 places all groups of the other node in the "down" state in the group states of other nodes that are shown in FIG. 6. If there are groups that have changed from an "up" state group to a "down" state group as a result of placing these groups in the "down" state, group state management unit 52 forcibly disconnects ports that belong to these groups, and moreover, that have the control attribute "ON," as previously explained.

Explanation next regards an actual example of the operation of the trunk network according to the second embodiment.

Figure 14:
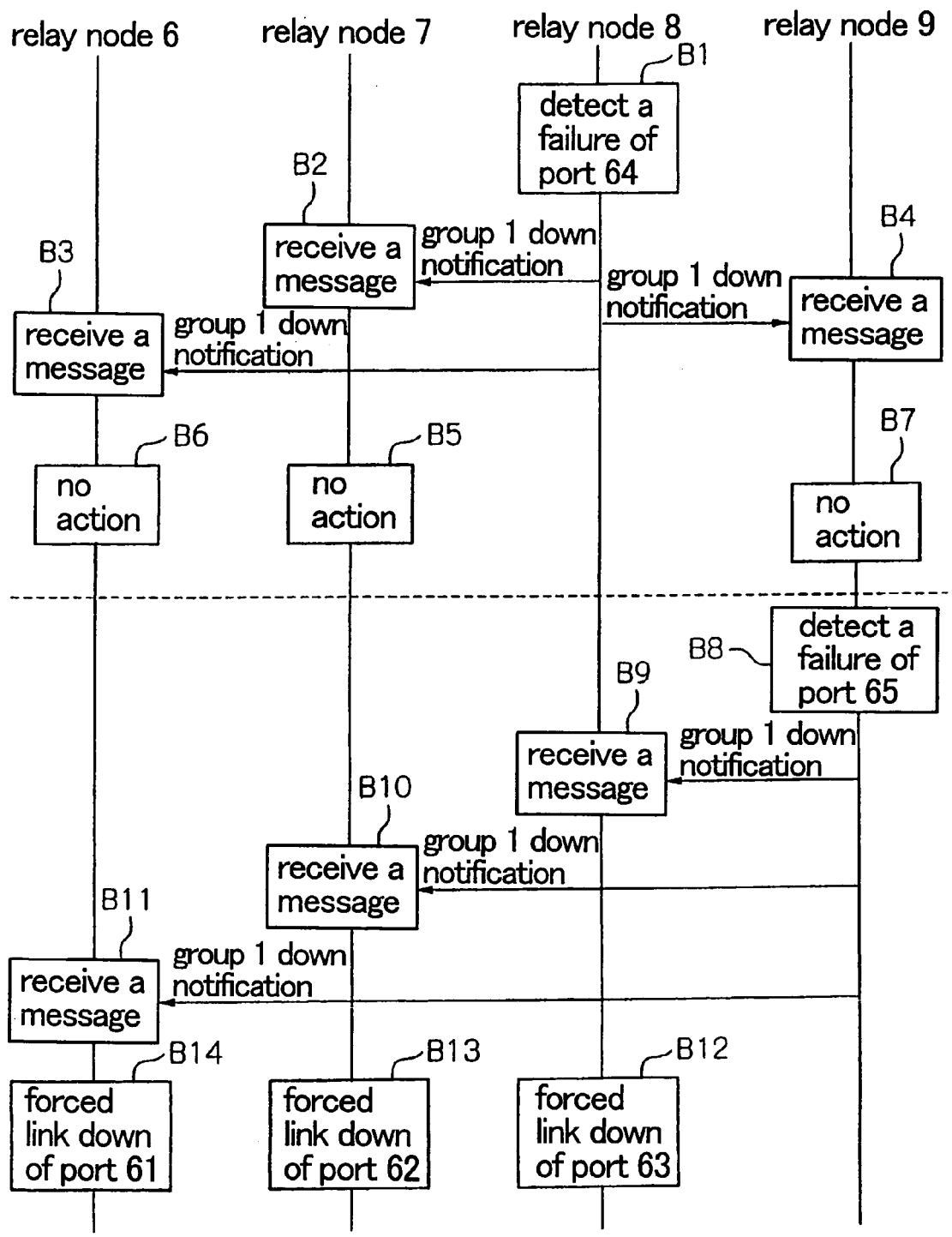
FIG. 14 is a sequence chart showing an example of the operation when the failure of port 64 is detected in relay node 8, following which the failure of port 65 is detected in relay node 9.

FIG. 14 is a sequence chart showing an example of the operation when a failure of port 64 is detected in relay node 8, following which a failure of port 65 is detected in relay node 9.

Referring to FIG. 14, relay node 8 first detects a failure of port 64 detects in port state monitor unit 51 (Step B1).

Port state monitor unit 51, having detected the failure of port 64, refers to attribute table 48 of FIG. 12C, and checks the notification attribute of the group to which port 64 belongs. In this case, port 64 belongs to group 1, and the notification attribute of group 1 is "ON." As a result, port state monitor unit 51 notifies group state management unit 55 of the state change indicating that the group 1 link is "down." Based on the notification from port state monitor unit 51, group state management unit 55 instructs message processor 54 to prepare and transmit a message indicating that the link of group 1 is "down." In accordance with the instruction from group state management unit 55, message processor 54 prepares and transmits a message, whereupon the message is sent from relay node 8 to the other nodes 6, 7, and 9.

Relay node 7 receives the message from relay node 8 in message processor 54 and analyzes the message (Step B2). However, the state of group 1 of relay nodes 6 and 9 is "up," and group state management unit 55 of relay node 7 therefore does not take group 1 as a "down" state group. As a result, relay node 7 takes no action regarding port 62 (Step B5).

Relay node 6 receives the message from relay node 8 in message processor 54 and analyzes the message (Step B3). However, the state of group 1 of relay nodes 7 and 9 is in the "up" state, and group state management unit 55 of relay node 6 therefore does not take group 1 as a "down" state group. As a result, relay node 6 takes no action regarding port 61 (Step B6).

Relay node 9 receives the message from relay node 8 in message processor 54 and analyzes the message (Step B4). In relay node 9, however, no action is taken because there is no external connection port in which the control attribute is "ON" (Step B7).

Relay node 9 next detects the failure of port 65 in port state monitor unit 51 (Step B8).

Port state monitor unit 51, having detected the failure of port 65, refers to attribute table 49 of FIG. 12D, and checks the notification attribute of the group to which port 65 belongs. In this case, port 65 belongs to group 1, and the notification attribute of group 1 is "ON." As a result, port state monitor unit 51 reports to group state management unit 55 the change in state indicating that the link of group 1 is "down." Group state management unit 55, based on the notification from port state monitor unit 51, instructs message processor 54 to prepare and transmit a message indicating the "link down" of group 1. In accordance with the instruction from group state management unit 55, message processor 54 prepares and transmits a message, whereupon the message is sent from relay node 3 to the other relay nodes 6, 7, and 8

Relay node 8 receives and analyzes the message from relay node 9 in message processor 54 (Step B9). Relay node 8 then refers to attribute table 48 of FIG. 12C in group state management unit 55. In this case, the control attribute of port 63 is "ON," and relay node 8 therefore forcibly disconnects port 63 (Step B12).

Relay node 7 receives the message from relay node 9 in message processor 54 (Step B10). Relay node 7 then refers to attribute table 47 of FIG. 12B in group state management unit 55 and checks the control attribute of each port. In this case, the control attribute of port 62 is "ON," and relay node 7 therefore forcibly disconnects port 62 (Step B13).

Relay node 6 receives and analyzes the message from relay node 9 in message processor 54 (Step B11). Relay node 6 then refers to attribute table 46 of FIG. 12A in group state management unit 55 and checks the control attribute of each port. In this case, the control attribute of port 61 is "ON," and relay node 6 therefore forcibly disconnects port 61 (Step B14).

According to the present embodiment as described in the foregoing explanation, group state management unit 52 forcibly places external connection ports that belong to groups in the "down" state in the link "down" state for all other nodes and places external connection port that belong to groups that are in the "up" state in the "link up" state for any other node. Group state management unit 55 can therefore maintain the state if even one port having the notification attribute set to "ON" survives within a group and report the failure when all ports have failed. For example, setting the notification attribute "ON" for a port that connects to a server as an external device and setting the notification attribute "OFF" for a port that is connected to a client enables notification to be implemented when all servers have failed.

While preferred embodiments of the present invention have been described using specific terms, such description is for illustrative purposes only, and it is to be understood that changes and variations may be made without departing from the spirit or scope of the following claims.

What is claimed is:

1. A failure notification method of a trunk network in which a plurality of nodes is connected together; the failure notification method comprising steps of:

classifying external connection ports of said plurality of nodes into groups in advance, and setting in said nodes the correspondence of said external connection ports and said groups;

upon detecting a change in the state of said external connection port in any node, transmitting state information, which includes the state of the groups to which the external connection port belongs, from that node to the other nodes that make up said trunk network;

in said other nodes that have received said state information, forcibly changing the states of external connection ports that belong to said groups in accordance with the states of said groups that are included in said state information; and setting a control attribute for determining whether states of external connection ports are to be changed upon receiving state information of groups to which the external connection ports belong, wherein:

in addition to the correspondence of said external connection ports and said groups, a notification attribute is set in said plurality of nodes, said notification attribute determining whether, when a change occurs in the state of an external connection port, state information of that group is to be reported to said other nodes;

in said plurality of nodes, the states of groups, to which belong external connection ports in which said notification attribute has been set for notification, are managed as group states of their own nodes;

in a node that has detected a change in the state of the external connection port, if the notification attribute of the external connection port in which the state has changed is set for notification, the group states of its own node of groups that correspond to the external connection port are caused to change, whereby the state information of the group is reported to said other nodes;

in said plurality of nodes, the group states of other nodes that show the states of groups to which belong external connection ports in said other nodes in which said notification attribute is set for notification are managed in correspondence with said other nodes based on notification from said other nodes;

in said plurality of nodes, the reachability of packets with said other nodes is monitored;

in nodes in which changes in reachability with other nodes has been detected, the group states of other nodes that correspond to the other nodes in which reachability has changed are caused to change; and the states of external connection ports are forcibly changed in accordance with the changes in said group states of other nodes.

2. A method according to claim 1, wherein:

said group states of other nodes are ether "up" states that indicate "link up" in said other nodes or "down" states that indicate "link down" in said other nodes;

if said group states of other nodes are a "down" state for any other node, the states of external connection ports that belong to groups that correspond to said group states of other nodes are forcibly made "link down"; and if said group states of other nodes are in the "up" state for all other nodes, the states of external connection ports that belong to groups that correspond to said group states of other nodes are made "link up".

3. A method according to claim 1, wherein:

said group states of other nodes are either "up" states that indicate "link up" in said other nodes or "down" states that indicate "link down" in said other nodes;

if said group states of other nodes are in the "down" state for all other nodes, the states of external connection ports that belong to groups that correspond to said group states of other nodes are forcibly made "link down"; and if said group state of other nodes is in the "up" state for any other node, the states of external connection ports that belong to groups that correspond to said group states of other nodes are made "link up".

4. A method according to claim 1, wherein:

the states of the external connection ports are changed only when said control attribute of said external connection ports is set for change.

5. A node device for constituting a trunk network that connects together external devices, said node device comprising:

external connection ports for connecting with said external devices;

a port state monitor unit for classifying said external connection ports into groups in advance, storing the correspondence of said external connection ports and said groups, and detecting changes in the states of said external connection ports;

a group state management unit for, upon the detection in said port state monitor unit of a change in the state of any external connection port, reporting to other nodes that make up said trunk network state information that includes the states of groups to which the external connection port corresponds; and upon receiving state information from any other node and in accordance with the states of said groups that are included in the state information, changing the states of external connection ports that belong to these groups;

said port state monitor unit stores, in addition to the correspondence of said external connection ports and said groups, a control attribute that determines whether the states of the external connection ports are to be changed upon receiving state information of groups to which the external connection ports belong; and a topology control unit for monitoring reachability of packets with said other nodes, wherein:

said port state monitor unit stores, in addition to the correspondence of said external connection ports and said groups, a notification attribute that determines whether, when a change occurs in the state of the external connection port, the state information of that group is to be notified to said other nodes; and upon detecting a change in the state of the external connection port, reports the state of the external connection port to said group state management unit if the notification attribute of the external connection port is set for notification;

said group state management unit manages, as group states of its own node, the states of groups to which belong external connection ports in which said notification attribute is set for notification, and upon being notified of the state of the external connection port from said port state monitor unit, changes the group state of its own node for groups that correspond to the external connection port to thus report state information of the groups to said other nodes; and said group state management unit, based on changes in said reachability that is obtained in said topology control unit, manages, as group states of other nodes, the states of groups to which belong external connection ports in which said notification attribute is set for notification in said other nodes, and upon detection of a change in the reachability with another node in said topology control unit, changes said group states of other nodes and forcibly changes the state of external connection ports in accordance with the change in the group states of other nodes.

6. A node device according to claim 5, wherein:
said group states of other nodes are either "up" states that indicate "link up" in said other nodes or "down" states that indicate "link down" in said other nodes; and
said group state management unit, if said group states of other nodes is a "down" state for any other node, forcibly sets the states as "link down" for external connection ports that belong to groups that correspond to said group states of other nodes; and if said group states of other nodes is the "up" state for all other nodes, sets the states to "link up" for external connection ports that belong to groups corresponding to said group states of other nodes.

7. A node device according to claim 5, wherein:
said group states of other nodes are either "up" states that indicate "link up" in said other nodes or "down" states that indicate "link down" in said other nodes; and
said group state management unit, if said group states of other nodes is a "down" state for all other nodes, forcibly sets the states as "link down" for external connection ports that belong to groups correspond to said group states of other nodes; and if said group states of other nodes is the "up" state for any other node, sets the states to "link up" for external connection ports that belong to groups corresponding to said group states of other nodes.

8. A node device according to claim 5, wherein:
said group state management unit changes the states of the external connection ports only when said control attribute of said external connection ports is set for change.

9. A trunk network system having a configuration in which node devices according to claim 5 are connected together.

10. A trunk network system of a configuration having a plurality of nodes in which said plurality of nodes are connected together, wherein:
external connection ports of said plurality of nodes are classified in groups in advance, and the correspondence of said external connection ports and said groups is set in said nodes;
upon detection of a change in the state of a said external connection port in any node, state information that includes the states of the groups to which the external connection port belongs is transmitted from the node to other nodes that make up said trunk network;
in said other nodes that have received said state information, the states of external connection ports that belong to the groups are forcibly changed in accordance with the states of said groups that are included in the state information;
a control attribute is set in said plurality of nodes for determining whether states of external connection ports are to be changed upon receiving state information of groups to which the external connection ports belong;
in addition to the correspondence of said external connection port and said groups, a notification attribute is set in said plurality of nodes for determining whether the state information of the groups is reported to said other nodes when changes occur in the states of the external connection ports;
in said plurality of nodes, the states of groups to which belong external connection ports in which said notification attribute is set for notification are managed as group states of their own nodes;
in nodes in which a change in the state of the external connection port has been detected, if the notification attribute of the external connection port in which a change in state has occurred is set for notification, the group states of their own nodes of the groups that correspond to the external connection port are changed and the state information of the groups is reported to said other nodes;
in said plurality of nodes, group states of other nodes that indicate the states of groups to which belong external connection ports in said other nodes in which said notification attribute is set for notification are managed to correspond to said other nodes based on notification from said other nodes;
in said plurality of nodes, reachability of packets with said other nodes is monitored;
in nodes in which changes in the reachability with other nodes is detected, the group states of other nodes that correspond to the other nodes in which reachability has changed are changed; and
the states of the external connection ports are forcibly changed in accordance with the changes in said group states of other nodes.

11. A trunk network system according to claim 10, wherein:
said group states of other nodes are either "up" states that indicate "link up" in said other nodes or "down" states that indicate "link down" in said other nodes; and
if said group states of other nodes is a "down" state for any other node, the states of external connection ports that belong to groups corresponding to said group states of other nodes are forcibly changed to "link down"; and
if said group states of other nodes are "up" states for all other nodes, the states of external connection ports that belong to groups corresponding to said group states of other nodes are made "link up".

12. A trunk network system according to claim 10, wherein:
said group states of other nodes are either "up" states that indicate "link up" in said other nodes or "down" states that indicate "link down" in said other nodes;
if said group states of other nodes are the "down" state for all other nodes, the states of external connection ports that belong to groups corresponding to said group states of other nodes are forcibly set to "link down"; and
if said group states of other nodes is an "up" state for any other node, the states of external connection ports that belong to groups corresponding to said group states of other nodes are set to "link up".

13. A trunk network system according to claim 10, wherein:
the states of the external connection ports are changed only when said control attribute of said external connection ports is set for change.

14. A trunk network system according to claim 10, wherein external connection devices that are connected to said external connection ports of said plurality of nodes are multipoint connected.

15. A trunk network system according to claim 10, wherein said plurality of nodes is connected in a ring.

* * * * *